United States Patent
Seegert

(10) Patent No.: US 10,252,614 B2
(45) Date of Patent: Apr. 9, 2019

(54) UTILITY VEHICLE THROTTLE PEDAL

(71) Applicant: Deere & Company, Moline, IL (US)

(72) Inventor: Brian D. Seegert, Hartford, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/417,356

(22) Filed: Jan. 27, 2017

(65) Prior Publication Data

US 2018/0215261 A1 Aug. 2, 2018

(51) Int. Cl.
| | | |
|---|---|---|
| B60K 26/02 | (2006.01) | |
| B60K 26/04 | (2006.01) | |
| F16C 1/22  | (2006.01) | |
| F16C 1/10  | (2006.01) | |
| F16C 1/14  | (2006.01) | |

(52) U.S. Cl.
CPC .............. *B60K 26/02* (2013.01); *B60K 26/04* (2013.01); *F16C 1/105* (2013.01); *F16C 1/14* (2013.01); *F16C 1/223* (2013.01); *B60K 2026/043* (2013.01); *F16C 2360/00* (2013.01)

(58) Field of Classification Search
CPC .. B60K 26/02; B60K 26/04; B60K 2026/043; F16C 1/262; F16C 1/223; G05G 1/46
See application file for complete search history.

(56) References Cited

U.S. PATENT DOCUMENTS

| | | | |
|---|---|---|---|
| 3,468,187 A * | 9/1969 | Payerle ................ | B60K 26/02 74/105 |
| 3,730,315 A | 5/1973 | Camp | |
| 3,752,008 A | 8/1973 | Danek | |
| 4,263,998 A | 4/1981 | Moriya | |
| 4,546,666 A | 10/1985 | Secord | |
| 4,738,155 A | 4/1988 | Stocker | |
| 4,773,278 A | 9/1988 | Hanoaka et al. | |
| 4,800,773 A | 1/1989 | Nakamura et al. | |
| 4,889,005 A * | 12/1989 | Crack ..................... | F16C 1/12 74/501.6 |
| 4,889,006 A | 12/1989 | Kolinske et al. | |
| 5,966,994 A | 10/1999 | Woo | |
| 7,703,351 B2 * | 4/2010 | Sakuraba .............. | B60K 26/02 74/513 |
| 8,453,534 B2 * | 6/2013 | Tsai ........................ | B62L 3/02 74/502.2 |
| 9,358,885 B2 | 6/2016 | Bowers | |

* cited by examiner

*Primary Examiner* — Thomas C Diaz

(57) ABSTRACT

A utility vehicle throttle pedal includes a one piece molded plastic body pivotably mounted to a bracket, and having a face, an underside and first and second sidewalls between the face and underside. A throttle connect rod is positioned on the underside of the plastic body and has first and second ends entering first and second openings in the first and second sidewalls. A throttle cable is adjustably attached to the throttle connect rod. The throttle connect rod may be manually connected and disconnected from the throttle pedal without use of tools.

10 Claims, 4 Drawing Sheets

UTILITY VEHICLE THROTTLE PEDAL

FIELD OF THE INVENTION

This invention relates to a throttle pedal on a recreational or off road utility vehicle, and specifically to a utility vehicle throttle pedal connected to a throttle cable for an engine speed control or throttle.

BACKGROUND OF THE INVENTION

A utility vehicle throttle pedal may be connected by a throttle cable to an engine speed control or throttle. The throttle cable may be connected to the pedal using retaining members, clips or fasteners. For example, U.S. Pat. Nos. 3,730,318, 4,263,998, 4,738,155, 4,773,278 and 4,800,773 show throttle cables inserted through openings in the pedal face and secured with retaining members, clips or fasteners positioned on or protruding from the pedal face. During assembly, inserting a throttle cable through an opening in the pedal face and connecting the throttle cable to a retaining member, clip or fastener is difficult, time consuming, and hard to access. Connecting the throttle cable is not only a problem during assembly, but also when servicing a utility vehicle after extended use, because adjustment of the length or tension of the throttle cable may be required. A utility vehicle throttle pedal is needed that is quick and easy to assemble, including connection to a throttle cable. A utility vehicle throttle pedal is needed that simplifies adjustment of the length or tension of the throttle cable. A utility vehicle throttle pedal is needed that is low cost and does not require inserting a throttle cable through an opening in the face of the pedal, and does not require a retaining member, clip or fastener positioned on or protruding from the face of the pedal.

SUMMARY OF THE INVENTION

A utility vehicle throttle pedal includes a throttle connect rod that extends across the underside of the pedal between the first and second sidewalls. The throttle connect rod may be quickly and easily connected or disconnected from the pedal without tools. A throttle cable may be adjustably connected to the throttle connect rod. The throttle cable may be inserted through a throttle cable adjustment sleeve that may be rotated to adjust the length or tension of the throttle cable. The throttle pedal may be a one piece U-shaped plastic body having a face without any openings, retaining members, clips or fasteners on or protruding from the face.

DESCRIPTION OF THE PREFERRED EMBODIMENT

Figure 1:
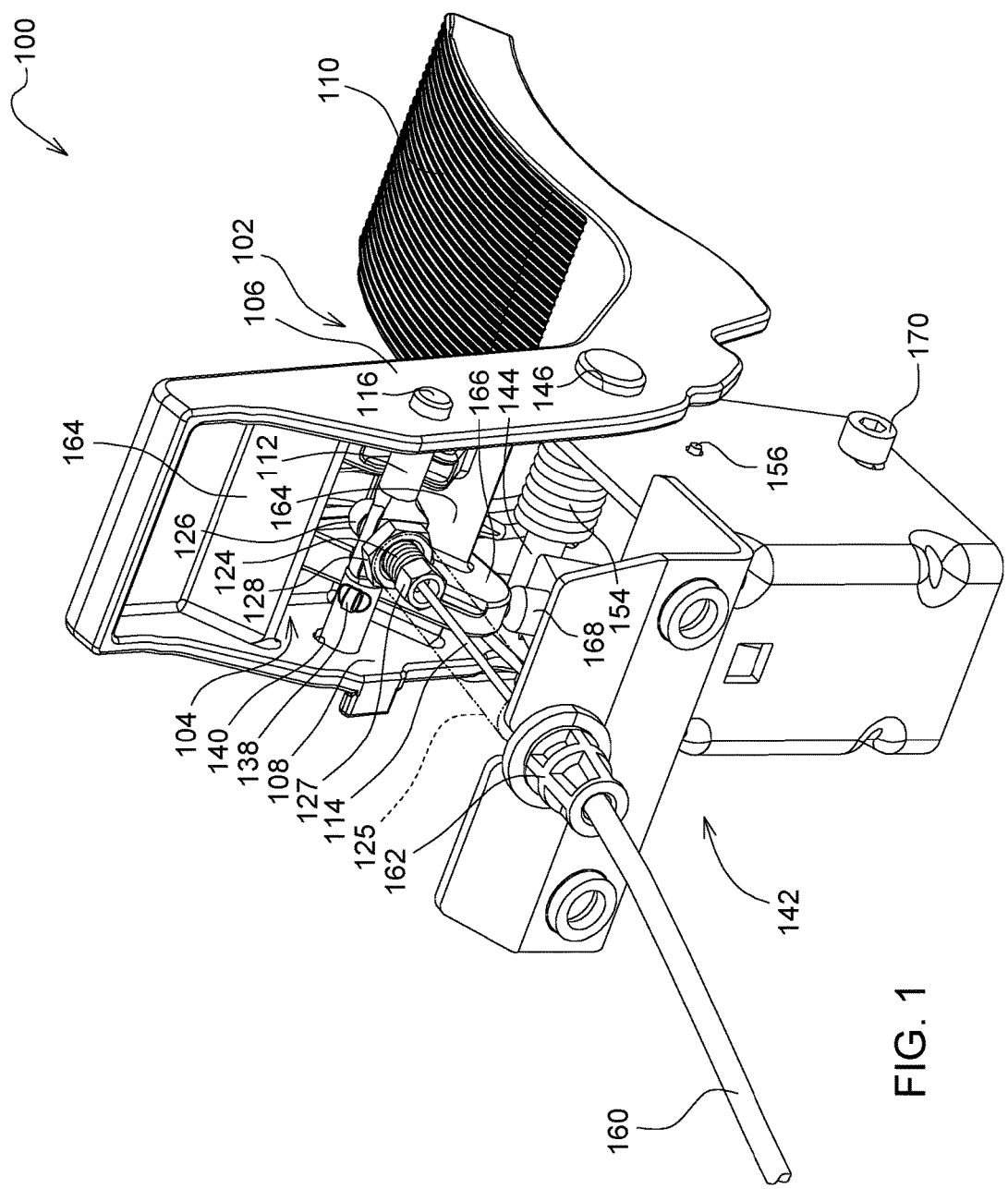
FIG. 1 is a perspective view of a utility vehicle throttle pedal according to a first embodiment of the invention.
Figure 2:
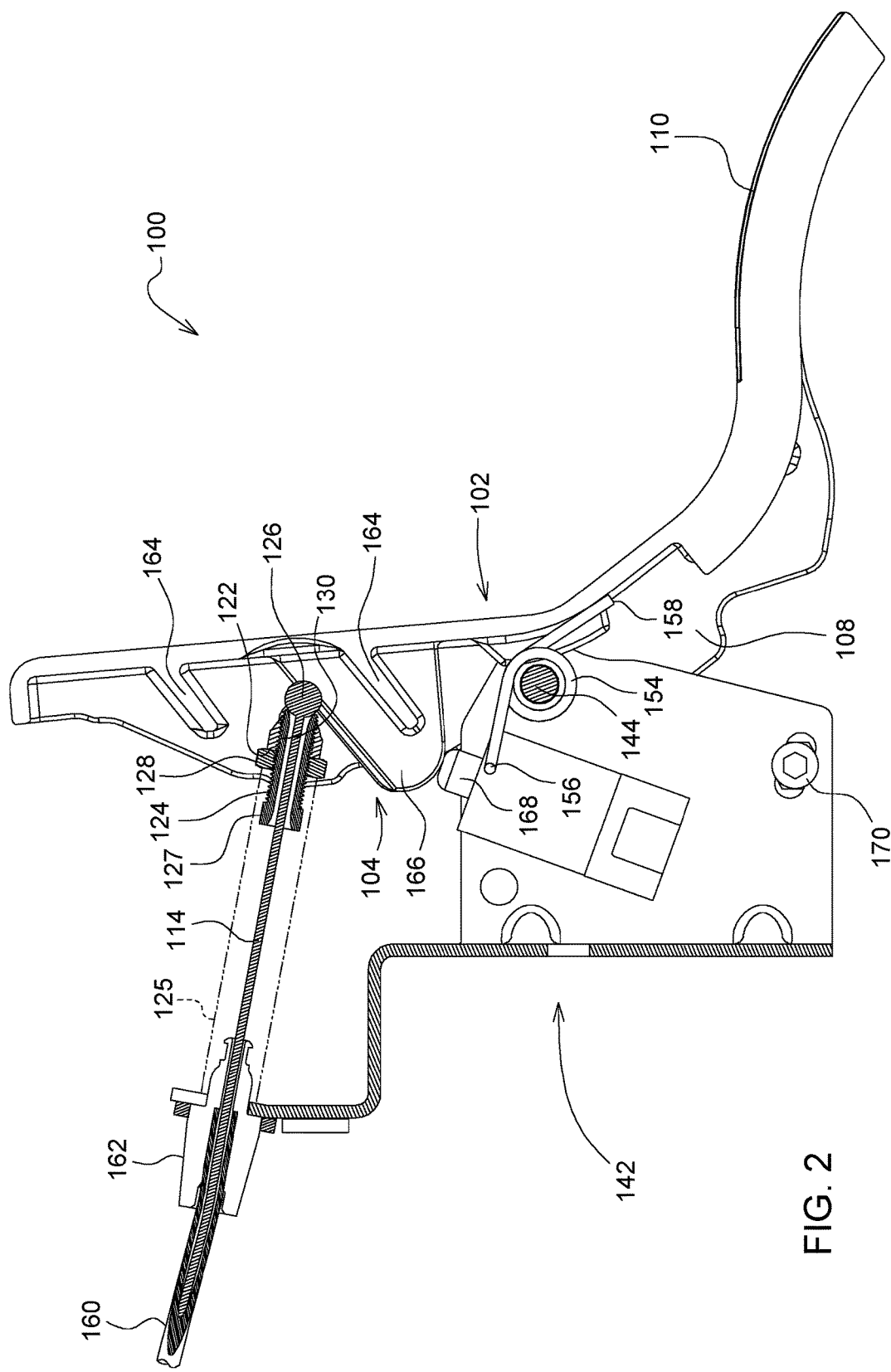
FIG. 2 is a side cross section view of a utility vehicle throttle pedal according to a first embodiment of the invention.

FIGS. 1-4 show an embodiment of utility vehicle throttle pedal 100 on a recreational or off-road utility vehicle. Utility vehicle throttle pedal 100 may include a one-piece generally U-shaped plastic body with pedal face 102 having a width of between about 1 inch and about 4 inches, an underside 104 with one or more supporting structures, and first and second sidewalls 106, 108 between the pedal face and underside. The pedal face may have grooves 110 molded into a first or lower end to provide a skid resistant surface. The utility vehicle throttle pedal may not have any openings in the pedal face, and does not require threading a throttle cable through an opening in the pedal face. It also does not have any retaining members, clips or fasteners positioned on or protruding from the pedal face.

In one embodiment, utility vehicle throttle pedal 100 may include throttle connect rod 112 positioned on the underside 104 of the throttle pedal and extending across the underside between first and second sidewalls 106, 108. The throttle connect rod may be quickly and easily connected or disconnected from the throttle pedal, so that it is easy to access the throttle cable connection. Initial assembly of the throttle connect rod to the throttle pedal, and connecting or disconnecting the throttle connect rod from the throttle pedal, may be done manually without requiring any tools or additional fasteners.

In one embodiment, throttle connect rod 112 may be a wire form having a diameter between about ¼ inch and about ½ inch, and a length between about 2 inches and about 4 inches from first end 116 to second end 118. Throttle connect rod 112 may be connected or disconnected from the throttle pedal without tools or other fasteners. To connect the throttle connect rod to the pedal, second end 118 may be inserted into second opening 134 in second sidewall 108, and then first end 116 may be inserted into first opening 132 in first sidewall 106. The throttle connect rod may extend between the throttle pedal sidewalls so that it may pivot on its longitudinal axis, and may have first and second radial features 136, 138 to retain it from sliding axially past first and second openings 132, 134 in the side walls.

In one embodiment, throttle cable 114 may be adjustably connected to throttle connect rod 112. The throttle cable may remain connected to the throttle connect rod during use, and remain connected when the throttle cable length or tension is adjusted. Disconnecting the throttle connect rod from the pedal makes the throttle cable more accessible and easy to adjust when the throttle connect rod is off the vehicle floor and not behind the pedal. After adjusting the throttle cable, the throttle connect rod then may be easily and quickly reconnected back to the throttle pedal.

In one embodiment, throttle cable 114 may be a flexible Bowden cable connected between throttle connect rod 112 and an engine speed control or throttle (not shown). During assembly, throttle cable 114 may be connected to throttle connect rod 112 by inserting the throttle cable through throttle cable adjustment sleeve 124, where end cap 126 on the end of the throttle cable may abut the end of throttle cable adjustment sleeve 124. Throttle cable adjustment sleeve 124 may be threaded into opening 130 in throttle connect rod 112. Throttle cable 114 may extend forwardly from the throttle connect rod through slot 158 in bracket 142, where the throttle cable may enter throttle cable housing 160. Optionally, flexible boot 125 may cover a portion of the throttle cable between throttle connect rod 112 and throttle cable housing 160. Cable housing connector 162 may connect throttle cable housing 160 to bracket 142.

In one embodiment, throttle cable adjustment sleeve 124 may include hex end 127 that may be gripped to rotate the sleeve and move it further into or out from opening 130 in the intermediate flat portion 122 of the throttle connect rod.

This changes the length or tension of throttle cable 114. Changing the length or tension of the throttle cable also may change the final or most open position of the throttle pedal slightly relative to bracket 142. Throttle cable adjustment jam nut 128 may be threaded to throttle cable adjustment sleeve 124, and may abut an intermediate flat portion 122 of throttle connect rod 112 to lock the throttle cable adjustment sleeve in place. It may be preferable to adjust throttle cable length or tension when the throttle connect rod is disconnected from the throttle pedal, but it also may be possible to make adjustments while the throttle connect rod is connected to the throttle pedal.

Figure 3:
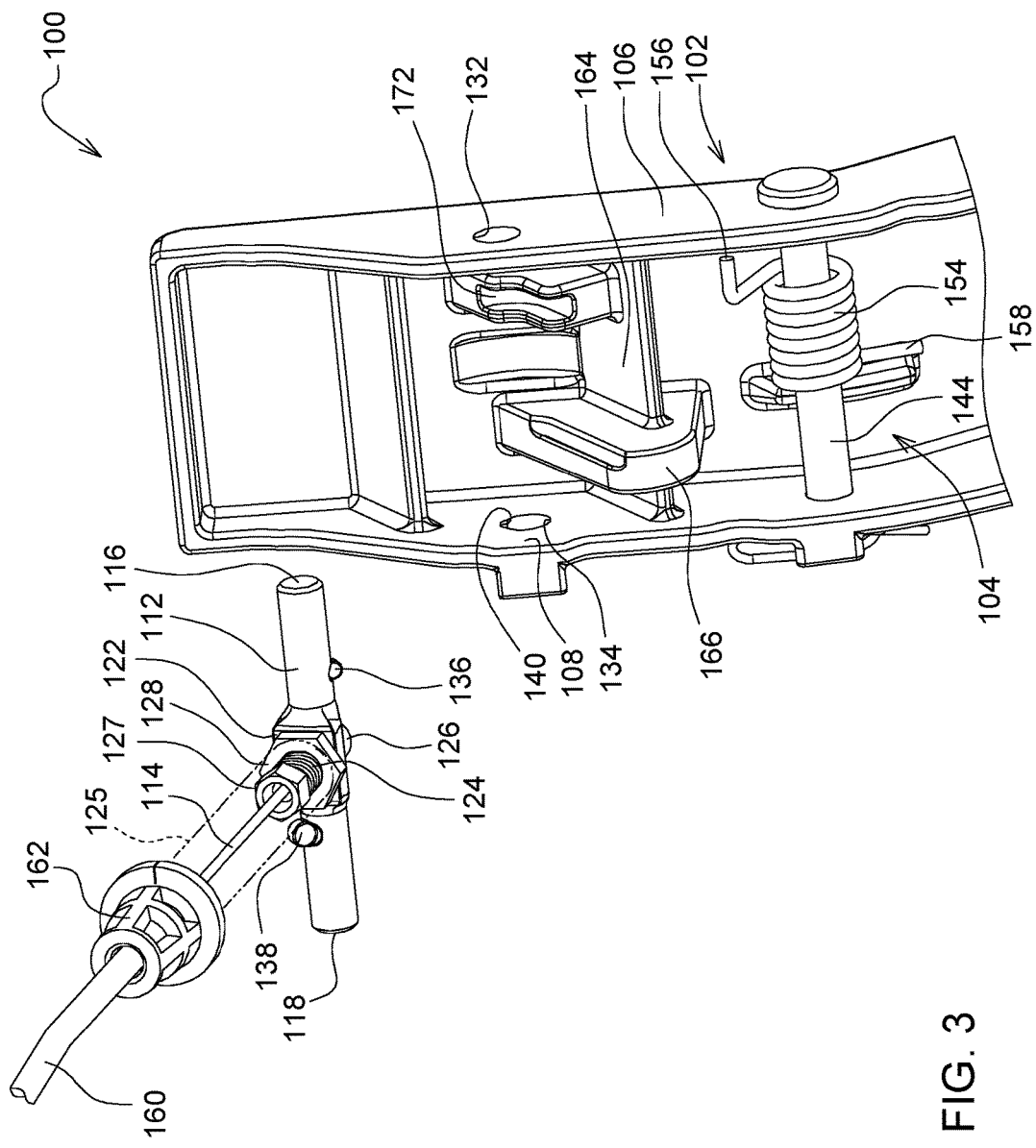
FIG. 3 is a perspective view of a utility vehicle throttle pedal with the throttle connect rod disconnected according to a first embodiment of the invention.

In one embodiment, as shown in FIG. 3, utility vehicle throttle pedal 100 may include features that require correct assembly of the throttle connect rod to the throttle pedal such that throttle cable adjustment jam nut 128 abuts the intermediate flat portion 122 of throttle connect rod 112. For example, correct assembly of the throttle connect rod may be required because second radial feature 138 is larger and/or extends out from the throttle connect rod more than first radial feature 136. Additionally, slot 140 may provide a gap on one side of second opening 134, while first opening 132 may not have a slot or gap.

Figure 4:
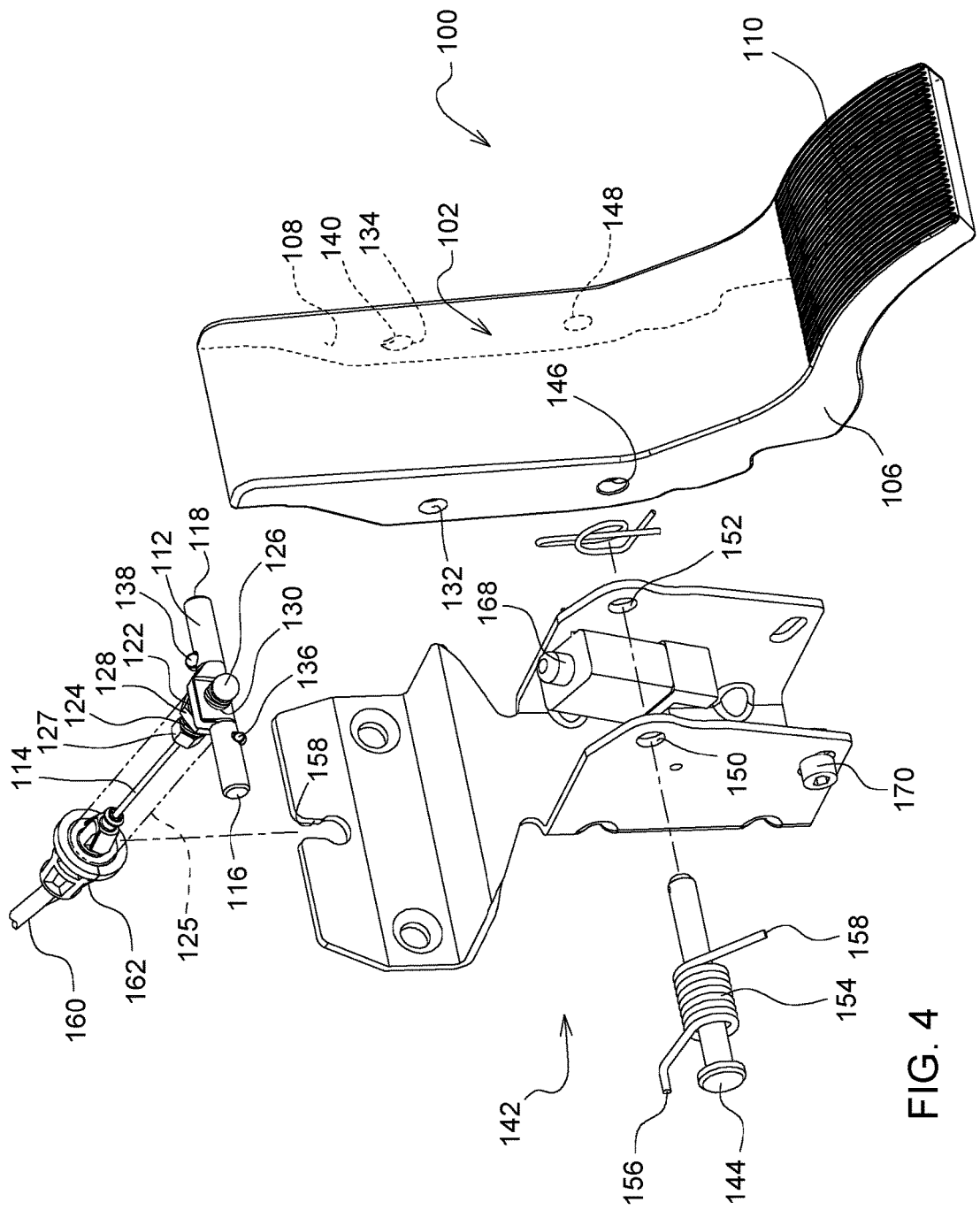
FIG. 4 is a perspective view of a utility vehicle throttle pedal that is disassembled with the throttle connect rod disconnected according to a first embodiment of the invention.

In one embodiment, as shown in FIG. 4, utility vehicle throttle pedal 100 may be pivotably mounted to throttle pedal mounting bracket 142, and may be biased to a non-depressed position. To pivotably mount the throttle pedal to the bracket, throttle pivot rod 144 may be positioned on the underside 104 of the throttle pedal and may extend across the underside between first and second sidewalls 106, 108. Throttle pivot rod 144 may extend through first and second openings 146, 148 in sidewalls 106, 108, and through corresponding first and second openings 150, 152 in bracket 142. To bias the throttle pedal to a non-depressed position, coil spring 154 may be positioned around throttle pivot rod 144 between the first and second openings in the bracket. First end 156 of coil spring 154 may engage bracket 142, and second end 158 may engage a feature or recess on underside 104 of the throttle pedal. Underside 104 may have a plurality of supporting structures such as ribs 164 between sidewalls 106, 108. Additionally, the underside of the throttle pedal may include switch actuating feature 166 which may actuate plunger switch 168 when the throttle pedal is depressed, and slot 172 which engages radial feature 136 to help align and maintain the throttle cable with the center of the pedal, and to help prevent the throttle connect rod from sliding axially. Bracket 142 also may have an adjustable stop screw 170 which provides a fully depressed position for the pedal.

Having described a preferred embodiment, it will become apparent that various modifications can be made without departing from the scope of the invention as defined in the accompanying claims.

The invention claimed is:

1. A utility vehicle throttle pedal, comprising:
   a throttle pedal having a face, an underside and first and second sidewalls between the face and the underside;
   a throttle connect rod extending across the underside of the throttle pedal and engaging a first opening in the first sidewall and a second opening in the second sidewall and an exterior surface of the rod having at least one feature that retains the rod from sliding axially; and
   a throttle cable adjustably connected to the throttle connect rod;
   wherein the throttle pedal is a one piece U-shaped plastic body having a face and the throttle cable does not extend through the face.

2. The utility vehicle throttle pedal of claim 1, further comprising a coil spring engaging and biasing the throttle pedal toward a non-depressed position.

3. The utility vehicle throttle pedal of claim 1, wherein the throttle connect rod includes first and second radial features on the exterior surface of the rod retaining the throttle connect rod in the first and second openings in the first and second sidewalls.

4. The utility vehicle throttle pedal of claim 1, further comprising grooves molded into the face of the pedal.

5. A utility vehicle throttle pedal, comprising:
   a one piece molded plastic body pivotably mounted to a bracket, and having a face, an underside and first and second sidewalls between the face and underside; and
   a throttle cable attached to a throttle connect rod positioned on the underside of the plastic body and having first and second ends entering first and second openings in the first and second sidewalls, and first and second radial features retaining the first and second ends adjacent the first and second openings.

6. The utility vehicle throttle pedal of claim 5, further comprising a throttle cable adjustment sleeve threaded to an opening in the throttle connect rod; the throttle cable inserted through the throttle cable adjustment sleeve.

7. The utility vehicle throttle pedal of claim 5, wherein the throttle connect rod is a wire form.

8. A utility vehicle throttle pedal, comprising:
   a throttle pedal having a face, an underside and first and second sidewalls between the face and the underside;
   a throttle connect rod extending across the underside of the throttle pedal and engaging a first opening in the first sidewall and a second opening in the second sidewall and an exterior surface of the rod having at least one feature that retains the rod from sliding axially;
   a throttle cable adjustably connected to the throttle connect rod;
   a throttle cable adjustment sleeve threaded into an opening in the throttle connect rod;
   the throttle cable inserted through the throttle cable adjustment sleeve and having an end cap abutting the throttle cable adjustment sleeve; and
   the throttle cable adjustment sleeve rotatable to adjust the throttle cable length.

9. A utility vehicle throttle pedal, comprising:
   a throttle cable adjustably connected to a throttle connect rod that is manually connected to but without extending through an underside of a molded U-shaped plastic body;
   a bracket on which the molded U-shaped plastic body is pivotably mounted and spring biased to a non-depressed position; and
   at least one retaining feature on an outer surface of the throttle control rod;
   wherein the throttle connect rod has a first end and a second end inserted into a first opening and a second opening in a first sidewall and a second sidewall of the throttle pedal, a first radial feature adjacent the first end and a second radial feature adjacent the second end, the second radial feature being larger than the first radial feature.

10. The utility vehicle throttle pedal of claim 9, further comprising a slot on a side of the second opening to retain the second radial feature from sliding out the second opening.

* * * * *